United States Patent
Lee

(10) Patent No.: US 9,552,778 B2
(45) Date of Patent: Jan. 24, 2017

(54) DIGITAL DEVICE AND METHOD FOR CONTROLLING THE SAME

(71) Applicant: LG Electronics Inc., Seoul (KR)

(72) Inventor: Yongsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 14/620,834

(22) Filed: Feb. 12, 2015

(65) Prior Publication Data

US 2016/0117994 A1 Apr. 28, 2016

(30) Foreign Application Priority Data

Oct. 27, 2014 (KR) .................. 10-2014-0145748

(51) Int. Cl.
| | | |
|---|---|---|
| *G06T 5/40* | (2006.01) | |
| *H04N 5/202* | (2006.01) | |
| *G09G 3/34* | (2006.01) | |
| *G09G 3/20* | (2006.01) | |
| *H04N 5/57* | (2006.01) | |

(52) U.S. Cl.
CPC .......... *G09G 3/3406* (2013.01); *G09G 3/2092* (2013.01); *H04N 5/57* (2013.01); *G09G 2320/062* (2013.01); *G09G 2320/0646* (2013.01); *G09G 2360/145* (2013.01)

(58) Field of Classification Search
CPC .............. G06T 5/40; G06T 5/50; H04N 5/202
See application file for complete search history.

(56) References Cited

U.S. PATENT DOCUMENTS

| | | | | |
|---|---|---|---|---|
| 8,115,836 | B2 * | 2/2012 | Miyahara ............. | H04N 5/2355 348/254 |
| 8,237,817 | B2 * | 8/2012 | Nakatani ................ | G03B 17/20 345/440 |
| 8,339,498 | B2 * | 12/2012 | Son ..................... | H04N 5/23293 348/235 |
| 9,053,664 | B2 * | 6/2015 | Lee ........................ | G09G 3/32 |
| 2009/0304279 | A1 | 12/2009 | Mori | |
| 2013/0169698 | A1 | 7/2013 | Lim | |
| 2013/0329422 | A1 | 12/2013 | Park et al. | |

FOREIGN PATENT DOCUMENTS

| | | |
|---|---|---|
| JP | 2009-300517 A | 12/2009 |
| KR | 10-2009-0040673 A | 4/2009 |
| KR | 10-2014-0076363 A | 6/2014 |

* cited by examiner

*Primary Examiner* — Ricardo L Osorio
(74) *Attorney, Agent, or Firm* — Birch, Stewart, Kolasch & Birch, LLP

(57) ABSTRACT

A method for controlling a digital device, and which includes receiving content; displaying the received content on a display screen of the digital device; calculating, via a controller of the digital device, an average luminance value respective to an entire display screen where the received content is displayed; generating, via the controller, a histogram respective to a partial area of the entire display screen; analyzing, via the controller, the histogram respective to the partial area and verifying whether or not a pixel distribution ratio of pixels having a minimum gray level, among pixels being located in the partial area of the display screen, is equal to or greater than a reference ratio; and if the pixel distribution ratio of pixels having the minimum gray level is equal to or greater than the reference ratio, processing a luminance of the partial area of the display screen to be black.

16 Claims, 12 Drawing Sheets

DIGITAL DEVICE AND METHOD FOR
CONTROLLING THE SAME

This application claims priority under 35 U.S.C. §119 to Korean Application No. 14/0145748, filed in Korea on 27 Oct. 2014 which is hereby incorporated in its entirety by reference as if fully set forth herein.

BACKGROUND OF THE INVENTION

Field of the Invention

The present invention relates to a digital device and, more particularly, to a digital device and a method for controlling the same that can equally control a luminance of a device.

Discussion of the Related Art

Generally, a display device includes a flat screen. However, with the recent development of a flexible panel, display devices being equipped with a curved screen are being researched and developed. For example, the display device may correspond to a mobile phone, a smart phone, a computer, a tablet personal computer (tablet PC), a notebook (or laptop) computer, a netbook, a Television (TV), other broadcast receiving device, and so on.

More specifically, for example, a display device that can realize both a flat mode and a curved mode enables a user to select a wanted (or desired) display mode in accordance with contents being displayed on the display device.

SUMMARY OF THE INVENTION

Accordingly, one aspect of the present invention is to provide a digital device and a method for controlling the same that substantially obviate one or more problems due to limitations and disadvantages of the related art.

Another aspect is to provide a digital device and a method for controlling the same that can eliminate (or remove) light leakage and stabilize the picture quality of the display screen by analyzing a histogram respective to a partial area of the display screen where the light-leakage property (or light leakage) occurs and by adjusting the luminance accordingly.

Yet another aspect is to provide a digital device and a method for controlling the same that can stabilize the picture quality of the display screen by categorizing content undergoing a small amount of change in the gray level and by displaying the categorized content in a partial area where light leakage occurs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in an aspect of the present invention, a method for controlling a digital device includes the steps of receiving content, displaying the received content on a display screen, calculating an average luminance value respective to an entire display screen where the received content is displayed, generating a histogram respective to a partial area of the entire display screen, analyzing the histogram respective to the partial area and verifying whether or not a pixel distribution ratio of pixels having a minimum gray level, among pixels being located in the partial area of the display screen, is equal to or greater than a reference ratio, In addition, based upon the verified result, if the pixel distribution ratio of pixels having a minimum gray level is equal to or greater than the reference ratio, processing a luminance of the partial area of the display screen to be black.

In another aspect of the present invention, a digital device includes a communication module configured to receive content, a display module configured to display the received content on a display screen, and a controller configured to control an operation of the digital device, wherein the controller may be configured to calculate an average luminance value respective to an entire display screen where the received content is displayed, to generate a histogram respective to a partial area of the entire display screen, to analyze the histogram respective to the partial area and to verify whether or not a pixel distribution ratio of pixels having a minimum gray level, among pixels being located in the partial area of the display screen, is equal to or greater than a reference ratio, and to control a voltage being supplied to a part of multiple light sources being positioned in the display module, so as to process a luminance of the partial area of the display screen to be black, if the pixel distribution ratio of pixels having a minimum gray level is equal to or greater than the reference ratio based upon the verified result.

Both the foregoing general description and the following detailed description of the present invention are and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
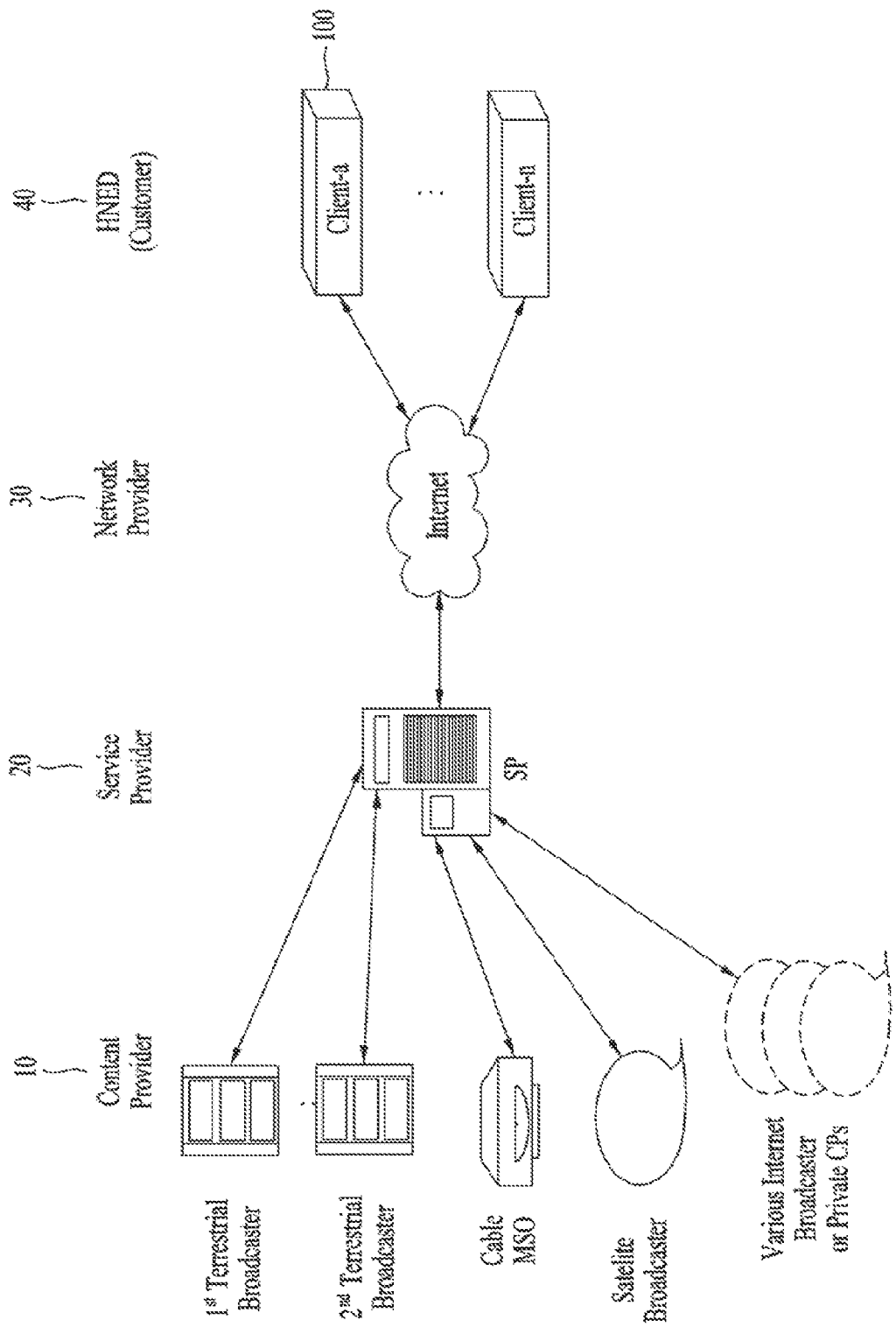
FIG. 1 illustrates a general view of a service system including a digital device according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts, and repeated description will be omitted for simplicity. The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention. Each of the suffixes will not be signified or used to differentiate one from the other.

Additionally, the accompanying drawings are merely provided to facilitate the understanding the embodiments disclosed in this specification. In addition, therefore, the technical scope and spirit disclosed in this specification will not be limited only to the accompanying drawings. Therefore, the accompanying drawings include all variations, equivalents and replacements that are included in the technical scope and spirit of the present invention.

Terms including ordinal numbers, such as "first", "second", and so on, may be used illustrating diverse elements. However, such elements will not be limited only to such terms. Herein, the corresponding terms will only be used to differentiate one element from another element. When an element is said (or described) to be "connected to" or "in connection with" another element, the corresponding element may be directly connected to or may be in direct connection with the other element. However, it should be understood that yet another element may exist in-between. Conversely, when an element is said (or described) to be "connected to" or "in connection with" another element, although the corresponding element may be directly connected to or may be in direct connection with the other element, it should also be understood that no other element exists between the two elements.

In this application, the terms "include(s)" or "have (or has)" are merely used to indicate the presence of a characteristic, number, step, operation, element, assembly part, or a combination of at least two or more of the above, which are mentioned in the description of the present invention. Therefore, the presence or possibility of additionally including one or more of other characteristics, numbers, steps, operations, elements, assembly parts, or combinations of the above will not be excluded in advance.

Hereinafter, a digital device, which is described in the description of the present invention, includes all types of devices performing at least one or more of transmission, reception, processing, and outputting of data, content, service, application, and so on. The digital device may be paired or connected (hereinafter referred to as "pairing") with another digital device, such as an external server, through a wired/wireless network, and the digital device may then perform transmission/reception of data through such pairing. In addition, whenever required, the data may be adequately converted prior to the transmission/reception. Herein, for example, the digital device may include standing devices, such as a Network TV, a Hybrid Broadcast Broadband TV (HBBTV), a Smart TV, an Internet Protocol TV (IPTV), a Personal Computer (PC), and so on, and mobile devices (or handheld devices), such as a Personal Digital Assistant (PDA), a Smart Phone, a Tablet Personal Computer (Tablet PC), a Laptop computer (or notebook computer). In this specification, in order to facilitate the understanding of the present invention and for simplicity in the description, a Digital TV will be given as an example in FIG. 1, and a mobile device will be given as an example in FIG. 2, and the digital device will be described accordingly. Additionally, the digital device, which is described in this specification, may be configured only of a panel or may be configured as a set within a configuration, device, system, and so on, such as a Set-Top Box (STB).

Meanwhile, a wired/wireless network, which is described in this specification, collectively refers to all communication networks supporting diverse communication standards and/or protocols for performing pairing and/or data transmission/reception between digital devices or between a digital device and an external server. Such wired/wireless network may include all types of communication networks that are currently supported and that will be supported in the future by a communication standard, and one or more communication protocols for the same may also be supported. Such wired/wireless network may be configured by networks for a wired connection and a communication standard and protocol for the same, such as a Universal Serial Bus (USB), a Composite Video Banking Sync (CVBS), a component, an S-video (analog), a Digital Visual Interface (DVI), a High Definition Multimedia Interface (HDMI), an RGB, a D-SUB, and so on, and configured by networks for a wireless connection and a communication standard and protocol for the same, such as Bluetooth, Radio Frequency Identification (RFID), Infrared Data Association (IrDA), Ultra Wideband (UWB), ZigBee, Digital Living Network Alliance (DLNA), Wireless LAN (WLAN) (or Wi-Fi), Wireless broadband (Wibro), World Interoperability for Microwave Access (Wimax), High Speed Downlink Packet Access (HSDPA), Long Term Evolution (LTE)/LTE-Advanced (LTE-A), Wi-Fi Direct, and so on.

Furthermore, when the term digital device is mentioned in this specification, according to the respective context, the term may refer to a standing device or a mobile device, and, unless specified otherwise, the term may also be used to refer to both the standing device and the mobile device.

Meanwhile, for example, as an intelligent device capable of supporting a broadcast receiving function, computer functions and support, at least one or more external inputs, and so on, the digital device may support e-mailing, web browsing, banking, gaming, executing applications, and so on, through the above-described wired/wireless network. Additionally, the digital device may be equipped with an interface for supporting at least one inputting or controlling means (hereinafter referred to as an 'inputting'), such as a manual type input device, a touch-screen, a spatial remote controller, and so on.

Moreover, the digital device may use a standardized universal Operating System (OS), and, most particularly, according to an embodiment, the digital device described in this specification may use a Web OS. Accordingly, the digital device may be capable of processing diverse services or applications, by adding, deleting, amending, updating, and so on, the corresponding services or application within a universal OS kernel or a Linux kernel, and, by doing so, the digital device may configure and provide a more user-friendly environment.

Meanwhile, the above-described digital device may receive and process an external input, and, the external input includes an external input device, i.e., all types of inputting means and/or digital devices being connected to the above-described digital device through a wired/wireless network, thereby being capable of transmitting/receiving data and processing the transmitted/received data. For example, the external input includes all types of digital devices, such as a High-Definition Multimedia Interface (HDMI), gaming devices, such as PlayStation or X-Box, and so on, a smart phone, a tablet PC, printing devices, such as a pocket photo, and so on, a smart TV, a Blu-ray device, and so on.

Furthermore, the term server, which is described in this description, refers to a digital device or system supplying data to the above-described digital device, i.e., a client, or a digital device or system receiving data from the above-described digital device, i.e., a client, and the server may also be referred to as a processor. For example, the server may include diverse types of servers, such as a portal server providing web pages, web content or web services, an advertising server providing advertising data, a content server providing content, a Social Network Service (SNS) server providing Social Network Service (SNS), a service server provided by a manufacturer, a Multichannel Video Programming Distributor (MVPD) for providing Video on Demand (VoD) or streaming services, a service server providing paid services (or charged services), and so on.

Moreover, for simplicity in the description of this specification, when reference is made only to the term application, based upon the respective context, the significance of the term may not only include the significance of an application but may also include the significance of a service. Hereinafter, the present invention will be described in detail with reference to the accompanying drawings.

FIG. 1 illustrates a general view of a service system including a digital device according to an embodiment of the present invention. Referring to FIG. 1, examples of a service system including a digital device may include a content provider (CP) 10, a service provider (SP) 20, a network provider (NP) 30, and a home network end user (HNED) (Customer) 40. The HNED 40 includes a client 100, that is, a digital device.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a first or second terrestrial broadcaster, a cable system operator (SO), a multiple system operator (MSO), a satellite broadcaster, various Internet broadcasters, private content providers (CPs), etc. The content can include applications as well as broadcast content. The SP 20 packetizes content provided by the CP 10. Referring to FIG. 1, the SP 20 packetizes content provided by the CP 10 into one or more services available for users. The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa. The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data. The server can use and request a content protection means such as conditional access. In this instance, the client 100 can use a means such as a cable card or downloadable CAS (DCAS), which corresponds to the content protection means of the server. In addition, the client 100 can use an interactive service through a network. In this instance, the client 100 can directly serve as the CP 10 and/or the SP 20 in a relationship with another client or indirectly function as a server of the other client.

Figure 2:
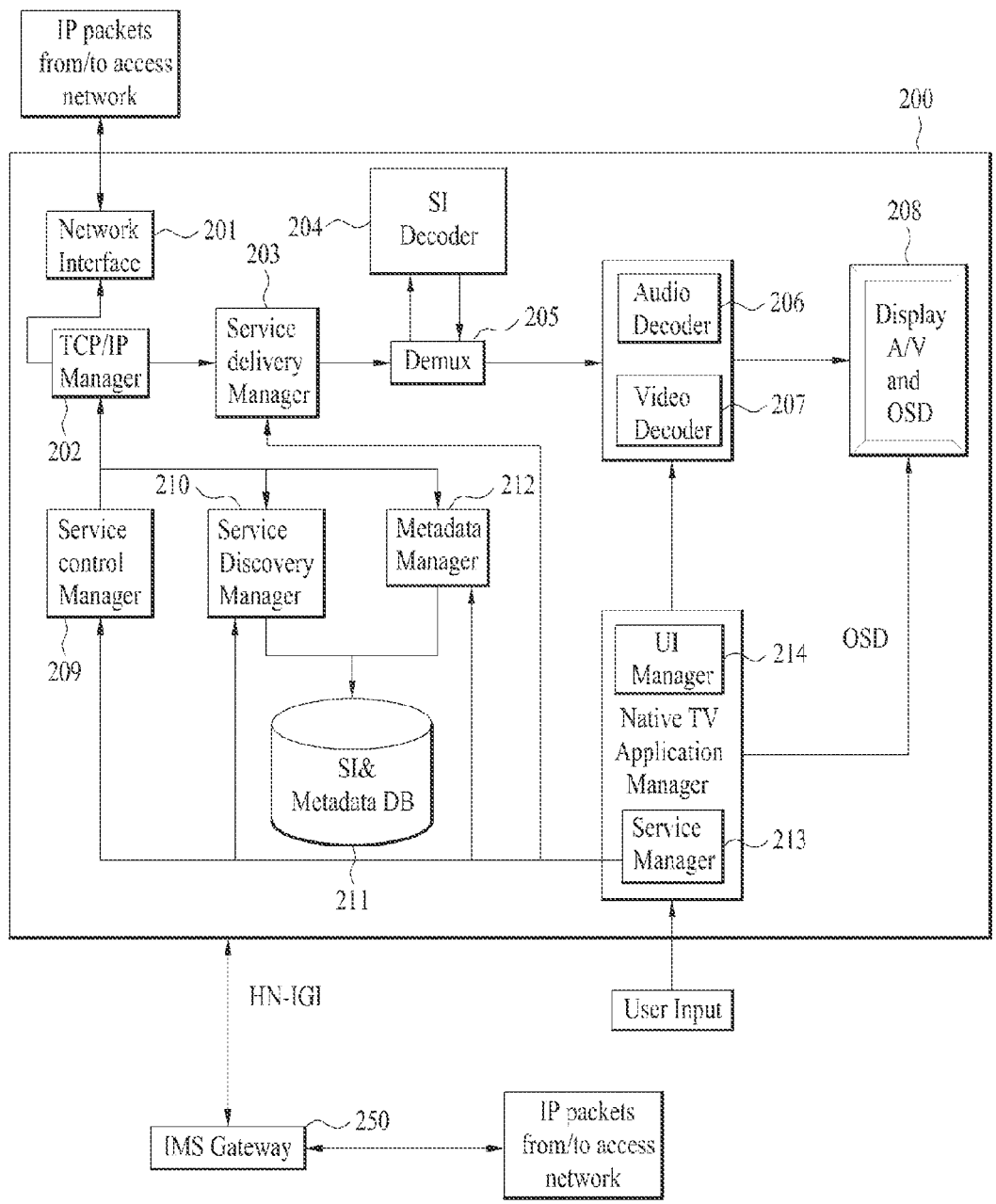
FIG. 2 illustrates a structural block view of a digital device according to an embodiment of the present invention.

FIG. 2 illustrates a structural block view of a digital device according to an embodiment of the present invention. The digital device 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital device 200 and IP packets transmitted from the digital device 200, that is, packet delivery between a source and a destination. The TCP/IP manager 202 may classify received packets according to an appropriate protocol and output the classified packets to the service delivery manager 203, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted based on the RTP, according to the RTP and transmits the parsed data packet to the demultiplexer 205 or store the parsed data packet in the SI & metadata DB 211 under the control of the service manager 213. The service delivery manager 203 can feed back network reception information to the server based on the RTP.

The demultiplexer 203 may demultiplex audio data, video data, SI from a received packet through packet identifier (PID) filtering and transmit the demultiplexed data to corresponding processors, that is, the audio/video decoder 206/207 and the SI decoder 204. The SI decoder 204 may parse and/or decode SI data such as program specific information (PSI), program and system information protocol (PSIP), digital video broadcast-service information (DVB-SI), etc. The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208. The application manager may include a service manager 213 and a user interface (UI) manager 214, administrate the overall state of the digital device 200, provide a UI, and manage other mangers.

The UI manager 214 can receive a key input from the user and provide a graphical user interface (GUI) related to a device operation corresponding to the key input through OSD. The service manager 213 may control and manage service-related managers such as the service delivery manager 203, the service discovery manager 210, the service control manager 209, and the metadata manager 212.

The service manager 213 may configure a channel map and enable channel control at the request of the user based on the channel map. The service manager 213 may receive service information corresponding to channel from the SI decoder 204 and set audio/video PID of a selected channel to the demultiplexer 205 so as to control the demultiplexing procedure of the demultiplexer 205.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital device 200 may provide a service (for example, SNS) through an image on the screen, the digital device 200 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital device 200 can store data, related with a service and input by the user during the service, in the memory in a similar manner such that the data is used to configure the service and, if required, process the data into a form required for another digital device and transmit the processed data to the other digital device or a related service server.

In addition, the application manager, the controller or the digital device can control information or an action corresponding to a request of the user to be executed when the user makes the request while using the SNS. For example, when the user selects input data of another user or a region corresponding to the input data while using the SNS, the application manager, the controller or the digital device may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital device.

When the user moves the first result (e.g., image data) to a broadcast program or broadcast service output area through drag & drop, the digital device can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this instance, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital device can automatically determine the type of the second process and whether or not to perform the second process based on a position variation of the first result. In this instance, coordinate information of the screen can be used for determining whether the position of the first result is changed or for information on a changed position between the second process and the first result. For example, when a service and/or OSD may be displayed on the screen, the digital device can determine and store coordinate information about the displayed service and/or OSD. Accordingly, the digital device can be aware of coordinate information about a service and data being provided to the screen in advance and thus can recognize a variation in the position (information) of the first result based on the coordinate information and perform the second process based on the position of the first result.

The service discovery manager 210 may provide information required to select a service provider that provides a service. Upon receipt of a signal for selecting a channel from the service manager 213, the service discovery manager 210 discovers a service based on the received signal. The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211. The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data. An IMS (IP Multimedia Subsystem) gateway 250 may include functions required to access an IMS based IPTV services.

Figure 3:
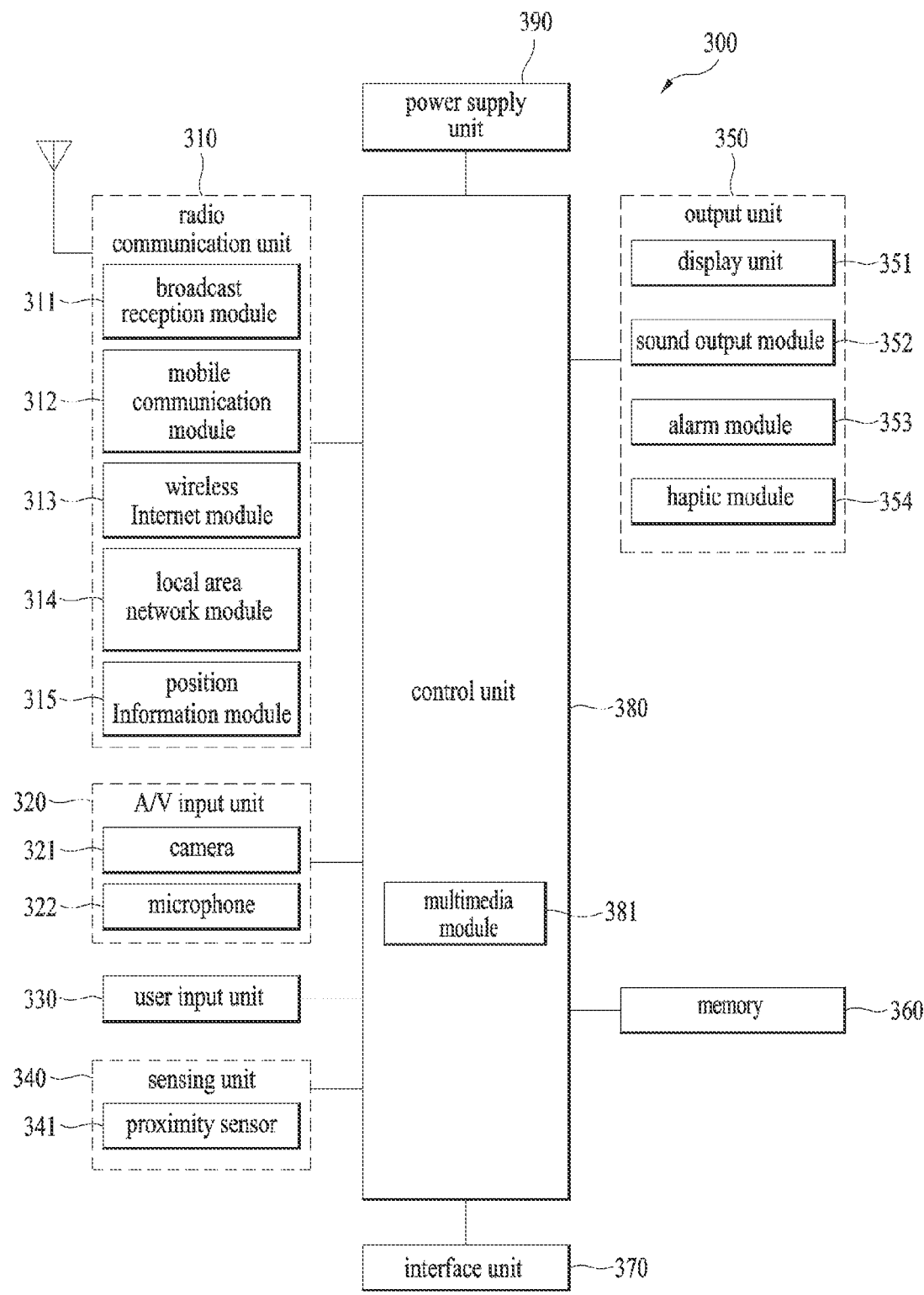
FIG. 3 illustrates a structural block view of a digital device according to another embodiment of the present invention.

FIG. 3 illustrates a structural block view of a digital device according to another embodiment of the present invention. With reference to FIG. 3, the mobile terminal 300 includes a wireless communication unit 310, an A/V (audio/video) input unit 320, a user input unit 330, a sensing unit 340, an output unit 350, a memory 360, an interface unit 370, a controller 380, and a power supply unit 390. FIG. 3 shows the mobile terminal 300 having various components, but implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication or local area network module 314, and a position-location or position information module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H). The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360. The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network. The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 can calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage. The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch. The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio or sound output module 352, an alarm module 353, a haptic module 354, and a projector module. The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300. If the display 351 and a sensor for detecting a touch action (hereinafter called 'touch sensor') are configured as a mutual layer structure (hereinafter called 'touch screen'), the display 351 is usable as an input device as well as an output device. In this instance, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size. If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, the proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. In addition, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm module 353 outputs a signal for announcing the occurrence of a particular event associated with the mobile terminal 300. Typical events include a call received, a message received and a touch input received. The alarm module 353 can output a signal for announcing the event occurrence by way of vibration as well as video or audio signal. The video or audio signal can be output via the display 351 or the audio output module 352. Hence, the display 351 or the audio output module 352 can be regarded as a part of the alarm module 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence.

The haptic module 354 can generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 can operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 can perform a pattern (or image) recognizing process for recognizing a writing input and a picture drawing input performed on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
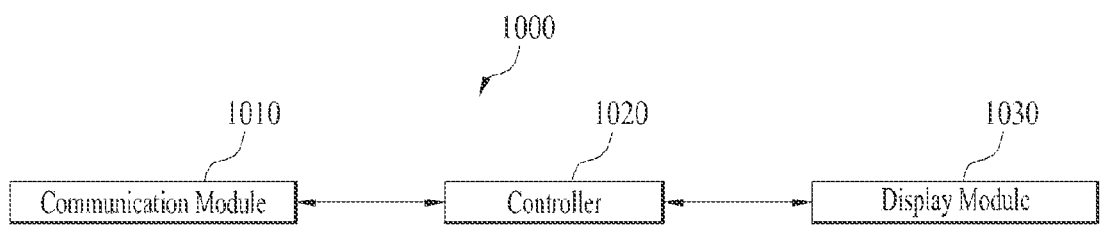
FIG. 4 illustrates a structural block view of a digital device according to an embodiment of the present invention.

FIG. 4 illustrates a structural block view of a digital device according to an embodiment of the present invention. As shown in FIG. 4, a digital device 1000 may include a communication module 1010, a display module 1030, and a controller 1020. Herein, the communication module 1010 receives content via wired or wireless communication. For example, the communication module 1010 may connect to Wi-Fi Direct in order to perform inter-device communication (or device-to-device communication), In addition, apart from Direct Wi-Fi, the communication module 1010 may also connect to diverse wireless communication, such as Wi-Fi, Bluetooth, infrared (IR) communication, Near Field Communication (NFC), and so on.

Thereafter, the display module 1030 may display the received content on a display screen. Herein, the display module 1030 may include a display panel, and a light source module supplying light to the display panel. In addition, the display panel may be configured to have a flat surface, wherein the entire display screen is flat, or may be configured to have a curved surface, wherein a portion of the display screen is curved (or bent).

In some cases, in accordance with a request signal of an external source, the display panel may be operated in a flat mode, wherein the entire display screen is operated in a flat state, or may be operated in a curved mode, wherein a portion of the display screen is operated in a curved state. More specifically, depending upon the user's selection, the display panel may realize the display screen is a flat mode and a curved mode.

Additionally, the display panel may include a first edge portion located on one side edge of the display screen, and a second edge portion located on another side edge of the display screen. Herein, when the display screen is operated in the curved mode, at least one of the first edge portion and the second edge portion of the display screen may be bent so as to form a curve. In some cases, in accordance with a control signal, the display panel may gradually change a curvature of its curved surface step-by-step.

Then, the controller 1020 may control the operations of the digital device 1000. Herein, the controller 1020 functions to perform an overall management of the functions of at least one or more of the communication module 1010, the display module 1030, and so on.

Herein, the controller 1020 calculates an average luminance value respective to the entire display screen on which content is displayed, and, the controller 1020 generates a histogram on a partial area of the entire display screen. Thereafter, by analyzing the histogram respective to the partial area, the controller 1020 verifies whether, among pixels located in the corresponding partial area, a pixel distribution ratio of pixels having a minimum gray level is equal to or greater than a reference ratio. Then, based upon the verified result, when the pixel distribution ratio of pixels having a minimum gray level is equal to or greater than the reference ratio, the controller 1020 may control a voltage, which is applied to some of the light sources, among multiple light sources being positioned in the display module 1030, so that the luminance of the corresponding partial area can be processed to be black.

In addition, the controller 1020 processes the partial area of the display screen to be black, because a light-leakage property (hereinafter referred to as "light-leakage") occurs at an edge portion of the display screen. When a dim (or dark) image is displayed, the light leakage occurs more distinctively, thereby causing light diffusion or light spots to occur in corner areas of the display screen and, eventually, degrading picture quality of the displayed image.

Accordingly, the controller 1020 analyzes the histogram respective to the corresponding partial area of the display screen where the light leakage occurs. Thereafter, when a pixel distribution ratio of pixels having a minimum gray level corresponding to the partial area is equal to or greater than a reference ratio, by processing the partial area of the display screen to be black, the controller 1020 may prevent the light leakage from occurring. Additionally, depending upon the type of the received content, the controller 1020 may decide an area of the overall display screen of the display module 1030 on which the received content is to be displayed.

Herein, the content type may correspond to an amount of change in the gray level respective to the content that is being displayed. For example, among the identified content types, the controller 1020 may decide a content having a small amount of change in the gray level as the content that is to be displayed on an edge portion of the overall display screen of the display module 1030. This is because, among the overall display screen of the display module 1030, light leakage occurs at the edge portion.

Therefore, by displaying content having a small amount of change in the gray level, such as supplemental information, news, web pages, and so on, adverse effect caused by light leakage may be prevented from influencing picture quality. In other words, even if light leakage occurs at the edge portion of the display screen, when supplemental information, news, web pages, and so on, are displayed at the edge portion of the display screen, the viewer will barely notice the degradation in the picture quality, which is caused by the light leakage.

This is because the difference in the contrast of the displayed image is not distinctive due to the small amount of change in the gray level. Additionally, the controller 1020 may also generate a histogram including a distribution ratio of pixels respective to the gray level. Moreover, the partial area respective to which the controller 1020 controls the luminance may correspond to at least any one of the first edge portion, which is located on one side edge of the display screen of the display module 1030, and the second edge portion, which is located on another side edge of the display screen of the display module 1030.

Herein, surface areas of the first and second edge portions may be identical to one another. In some cases, the surface area of the first edge portion or the surface area of the second edge may be smaller than a surface area of a center portion of the display screen. Alternatively, among the first edge portion and the second edge portion, at least any one portion may correspond to a curved surface having a predetermined curvature in its surface.

Therefore, in accordance with a request signal received from an external source, the controller 1020 may control the display panel, so that at least any one of the first edge portion and the second edge portion can become a curved surface. Occasionally, in accordance with the request signal received from an external source, the controller 1020 may control the display panel 1030, so that the curvature of the curved surface of the display panel 1030 can be gradually changed step-by-step.

Additionally, the controller 1020 may adjust (or control) the reference ratio in accordance with at least one of a curvature value of the curved surface respective to a partial area of the display panel 1030, a surrounding external brightness of the partial area of the display panel 1030, and content information being displayed on the partial area of the display panel 1030.

Herein, the content information may correspond to an amount of change in the gray level respective to the displayed content. Subsequently, when the pixel distribution ratio having a minimum gray level is less than the reference ratio, the controller 1020 may control (or adjust) the luminance of the partial area, so that the luminance can correspond to the average luminance value respective to the entire display screen of the display module 1030.

Furthermore, when the pixel distribution ratio of pixels having a minimum gray level is equal to or greater than the reference ratio, the controller 1020 may process the luminance of the corresponding partial area to be black, In addition, then, the controller 1020 may control the luminance of the remaining area of the display screen to be lower (or less) than the average luminance value respective to the entire display screen of the display module 1030.

If a difference in luminance between the partial area, which is processed to be black, and the remaining area is too distinctive (or large), this may cause inconvenience to the viewer and the viewer's eyes, such as blinding of the eyes.

In addition, therefore, by reducing the difference in the luminance between the partial area and the remaining area, a more comfortable and stable picture quality may be provided to the viewer.

Subsequently, by periodically analyzing the histogram respective to the partial area at constant intervals, the controller 1020 may control a voltage, which is applied to some of the light sources, among multiple light sources being positioned in the display module 1030. Herein, the controller 1020 may control a voltage, which is applied to some of the light sources, among multiple light sources being positioned in the display module 1030, by periodically analyzing the histogram respective to the partial area at an interval of approximately 10 to 100 milliseconds (msec).

Figure 5:
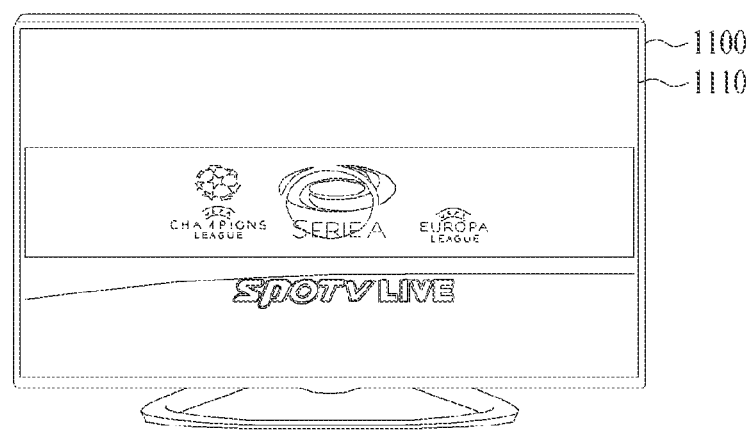
FIG. 5 and FIG. 6 respectively illustrate a digital device having a flat mode and a curved mode.
Figure 6:
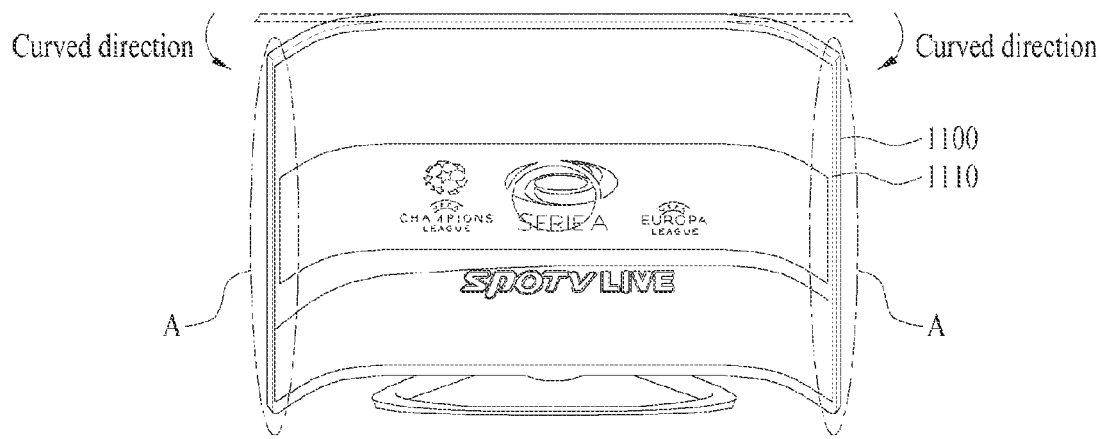

FIG. 5 and FIG. 6 respectively illustrate a digital device having a flat mode and a curved mode. FIG. 5 illustrates the digital device, which is operating in the flat mode, and FIG. 6 illustrates the digital device, which is operating in the curved mode. As shown in FIG. 5 and FIG. 6, the digital device 1100 may include a display screen 1110 on which content is displayed.

Herein, when operating in the flat mode, as shown in FIG. 5, the digital device 1100 may have a flat display screen having a flat surface, In addition, when operating in the curved mode, as shown in FIG. 6, the digital device 110 may have a curved surface having a predetermined curvature.

Although the curved surface of the display screen is advantageous, in that it provides lively viewing to the viewer, since light leakage occurs are an edge portion (A portion or area) of the display screen, this may lead to degradation in the picture quality of the displayed image.

More particularly, in corner areas of the display screen having a large level of bending, light leakage may occur more distinctively. When displaying a dim (or dark) image, such light leakage occurs more distinctively. Therefore, when a dim image is displayed on the display screen, by controlling the luminance at the edge portion of the display screen where the light leakage occurs, an optimal image is required to be provided to the viewer, so that the light leakage cannot be shown to the viewer.

By analyzing a histogram respective to a partial area of the display screen where the light leakage occurs, and among the pixels located in the partial area, by verifying whether a pixel distribution ratio of pixels having a minimum gray level is equal to or greater than a reference ratio, and when the pixel distribution ratio is equal to or greater than the reference ratio, by processing the luminance of partial area to be black, the present invention may provide an optimal image to the viewer, so that the light leakage is not shown to the viewer.

Figure 7:
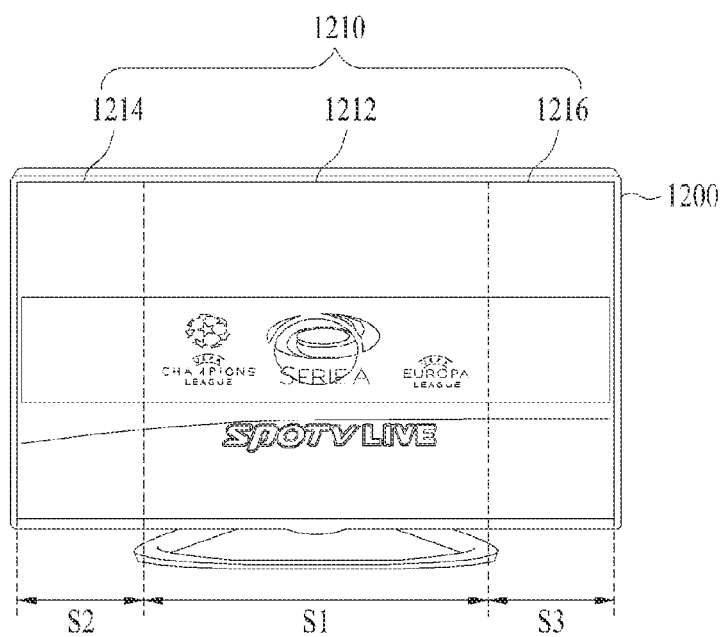
FIG. 7 and FIG. 8 illustrate display screens that are being divided for local dimming.
Figure 8:
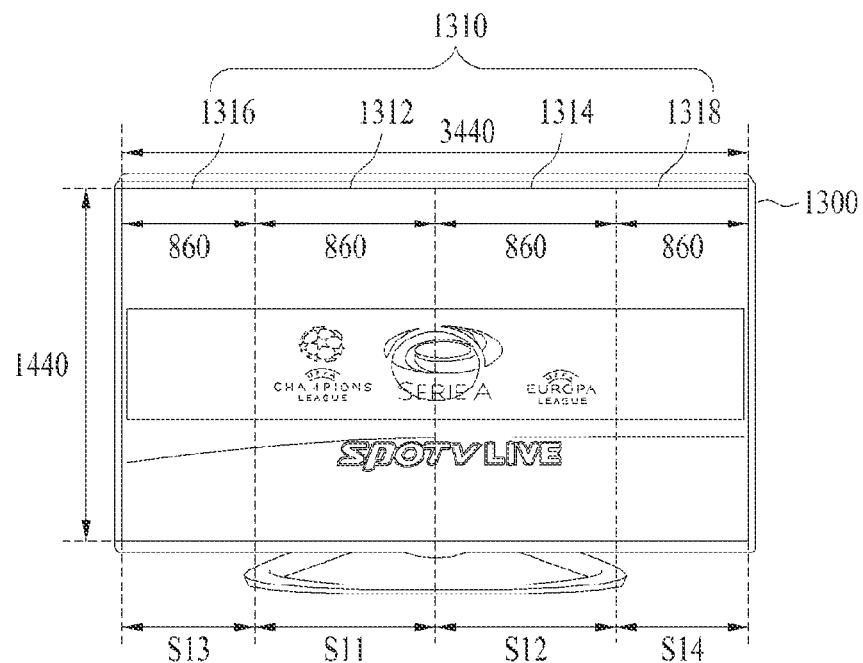

FIG. 7 and FIG. 8 illustrate display screens that are being divided for local dimming. FIG. 7 illustrates an example of a 16:9 display screen being divided into 3 sections, and FIG. 8 illustrates an example of a 21:9 display screen being divided into 4 sections. As shown in FIG. 7, a digital device 1200 calculates an average luminance value respective to an entire display screen 1210 where content is being displayed. Then, the digital device 1200 may generate a histogram respective to a partial area of the entire display screen 1210.

Then, the digital device 1200 analyzes a histogram respective to a partial area of the entire display screen 1210, and among the pixels located in the partial area, the digital device 1200 verifies whether a pixel distribution ratio of pixels having a minimum gray level is equal to or greater than a reference ratio. Then, based upon the verified result, when the pixel distribution ratio is equal to or greater than the reference ratio, the digital device 1200 may control a voltage being supplied to some of the light sources, among a plurality of light sources, so that the luminance of partial area can be processed to be black.

Herein, the partial area may correspond to at least any one of a first edge portion 1214, which is located on one side edge of a center portion 1212 of the entire display screen 1210, and a second edge portion 1216, which is located on another side edge of the center portion 1212 of the entire display screen 1210.

In some cases, surface areas S2 and S3 respective to the first edge portion 1214 and the second edge portion 1216 may be identical to one another. Alternatively, the surface areas S2 and S3 respective to the first edge portion 1214 and the second edge portion 1216 may be smaller than a surface area S1 of the center portion 1212.

Herein, among the first and second edge portions 1214 and 1216, at least any one portion may correspond to a curved surface having a predetermined curvature on its surface. More specifically, among the first and second edge portions 1214 and 1216, at least any one portion may correspond to an area where light leakage occurs.

Additionally, as shown in FIG. 8, when a size of the entire display screen 1310 of the digital device 1300 becomes larger, the center portion may also be divided into a larger number of sub-screens. For example, the entire display screen 1310 of the digital device 1300 may be divided into first and second edge portions 1316 and 1318 and first and second center portions 1312 and 1314.

Herein, surface areas S13 and S14 respective to the first and second edge portions 1316 and 1318 and surface areas S11 and S12 respective to the first and second center portions 1312 and 1314 may be identical to one another. For example, when approximately 3,440 pixels are positioned along a horizontal direction of the entire display screen 1310, and when approximately 1,440 pixels are positioned along a vertical direction of the entire display screen 1310, a number of pixels respective to the first and second edge portions 1316 and 1318 and a number of pixels respective to the first and second center portions 1312 and 1314 may be equal to one another.

Herein, among the first and second edge portions 1316 and 1318, at least any one portion may correspond to a curved surface having a predetermined curvature on its surface. More specifically, among the first and second edge portions 1316 and 1318, at least any one portion may correspond to an area where light leakage occurs.

As described above, in order to be capable of blocking (or preventing) light leakage, which occurs at edge portions of the display screen, the present invention may compensate the luminance of the edge portions or may process the luminance of the edge portions to be black. For this, in order to do so, the present invention may control a voltage level that is being supplied to light sources, in order to control (or adjust) the luminance of the light sources located at edge portions of the display screen.

Figure 9:
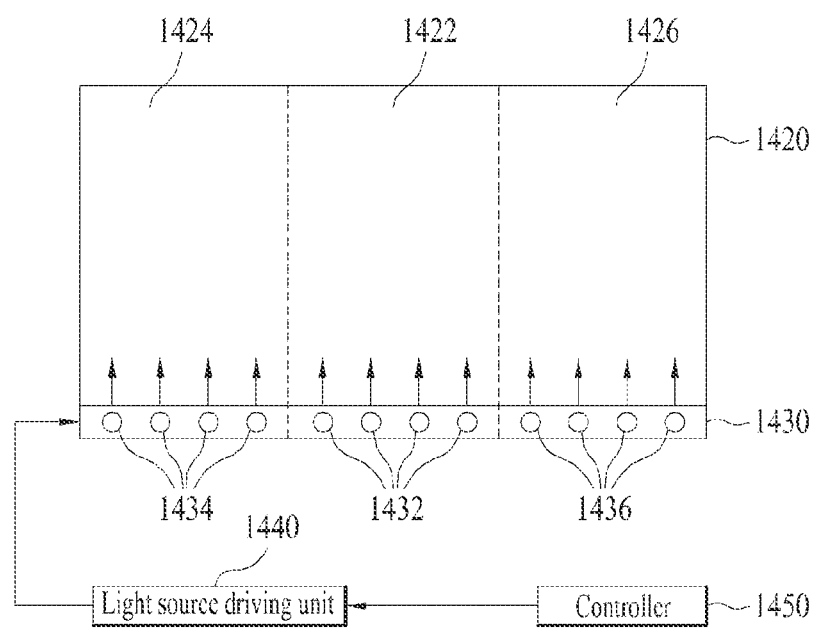
FIG. 9 illustrates a light source module that is being controlled for local dimming.

FIG. 9 illustrates a light source module that is being controlled for local dimming. As shown in FIG. 9, the display screen 1420 of the digital device may be divided into a center portion 1422, a first edge portion 1424, which is located on one side edge of the center portion 1422, and a second edge portion 1426, which is located on another side edge of the center portion 1422.

And, a light source module 1430 including a plurality of light sources may be positioned on a surrounding portion of the display screen 1420. Herein, the plurality of light sources may be divided into a first light source group 1432 being positioned on the center portion 1422 of the display screen 1420, a second light source group 1434 being positioned on the first edge portion 1424, which is located on one side edge of the center portion 1422, and a third light source group 1436 being positioned on the second edge portion 1426, which is located on another side edge of the center portion 1422.

Moreover, the first, second, and third light source groups 1432, 1434, and 1436 may be collectively controlled by a single controller or may be respectively controlled by a plurality of controllers. Herein, when the controller 1450 controls the luminance of the first and second edge portions 1424 and 1426 of the display screen, in order to control the light sources included in the second and third light source groups 1434 and 1436, which are respectively positioned on the first and second edge portions 1424 and 1426, the controller 1450 may control a light source driving unit 1440, which drives the second and third light source groups 1434 and 1436.

Additionally, in accordance with a control signal of the controller 1450, the light source driving unit 1440 may control the voltage levels being supplied to the light sources included in the second and third light source groups 1434 and 1436. Accordingly, the light sources being included in the second and third light source groups 1434 and 1436 may output light by adjusting the respective light intensity in accordance with the voltage levels being supplied by the light source driving unit 1440.

Figure 10:
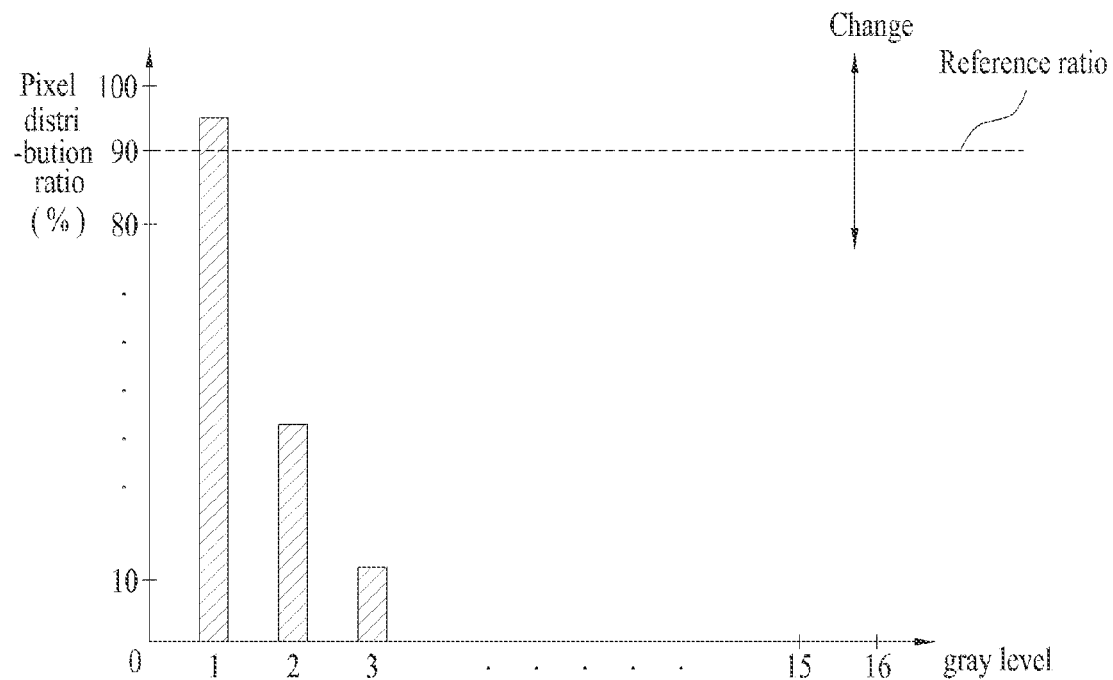
FIG. 10 illustrates a histogram of a screen area in which light-leakage property (or light-leakage) occurs.

FIG. 10 illustrates a histogram of a screen area in which light-leakage occurs. As shown in FIG. 10, when displaying an image, the digital device may generate light leakage at an edge portion of the display screen. More particularly, in a digital device having a curved display screen, such light leakage occurs frequently, thereby causing degradation in the picture quality. Accordingly, in order to prevent such degradation in picture quality from occurring due to light leakage, the digital device may generate a histogram respective to the edge portion of the display screen where the light leakage occurs.

In some cases, the area (or portion) where light leakage occurs may correspond to another partial area of the entire display screen. When an area (or portion) where light leakage occurs exists, the digital device generates a histogram respective to the corresponding area. Herein, the histogram may include a distribution ratio of pixels respective to the gray level.

In the histogram of FIG. 10, although the gray level is divided into 16 different levels, the gray level will not be limited only to this, and, therefore, the gray level may be divided into a number of levels less than 16 levels or greater than 16 levels. For example, if the gray level is divided into a number of levels greater than 16 levels, the gray level may be accurately analyzed. However, this may cause heavy operation load on the system. In addition, if the gray level is divided into a number of gray levels less than 16 levels, although the analysis process may be performed quickly, the gray level analysis may not be performed accurately.

Thereafter, the digital device may analyze the histogram respective to the partial area and, then, among the pixels being located in the corresponding partial area, the digital device may verify whether pixel distribution ratio of pixels having a minimum gray level is equal to or greater than the reference ratio.

Subsequently, if the pixel distribution ratio of pixels having minimum gray level is equal to or greater than the reference ratio, the digital device may process the luminance of the corresponding partial area to be black. In addition, if the pixel distribution ratio of pixels having minimum gray level is less than the reference ratio, the digital device may adjust the luminance of the corresponding partial area, so that the luminance can correspond to the average luminance value of the entire display screen.

For example, the histogram of FIG. 10 corresponds to a case when the reference ratio is set to approximately 90% of the pixel distribution ratio. More specifically, if the pixel distribution ratio of pixels having minimum gray level is equal to or greater than the reference ratio 90%, the digital device may process the luminance of the corresponding partial area to be black. In addition, if the pixel distribution ratio of pixels having minimum gray level is less than the reference ratio 90%, the digital device may adjust the luminance of the corresponding partial area, so that the luminance can correspond to the average luminance value of the entire display screen.

Accordingly, the reference ratio will not be limited only to 90%, and, therefore, the reference ratio may also be adjusted to diverse values. For example, the digital device may adjust (or control) the reference ratio in accordance with at least any one of a curvature value of the curved surface respective to a partial area of a display panel, a surrounding external brightness of the partial area of the display panel, and content information being displayed on the partial area of the display panel.

As described above, when the pixel distribution ratio of pixels having minimum gray level is equal to or greater than the reference ratio, the digital device processes the luminance of the corresponding partial area to be black because the light leakage becomes more distinctive, when a dim image is displayed.

More specifically, for the dim image having a minimum gray level, even if the luminance is compensated by adjusting the light intensity of the light source, it is difficult to overcome the degradation in picture quality. Therefore, the image of the corresponding area may be processed to be black by using diverse methods, such as turning the light source off, and so on.

However, in order to process the luminance of the corresponding partial area to be black, since the pixel distribution ratio of pixels having minimum gray level is required to be equal to or greater than the reference ratio, the luminance of the actual image prior to being processed as a black image may be close to a black scale. In some cases, if the luminance of a surrounding external environment is bright, in a view point (or stand point) of the viewer, the light leakage may not be distinctive in the partial area where light leakage occurs.

In this instance, the ratio for processing the image as a black image (also referred to as a black-image processing ratio) may be reduced by increasing the reference ratio. Additionally, if the luminance of a surrounding external environment is dark (or obscure), in the view point of the viewer, the light leakage may become more distinctive in the partial area where light leakage occurs.

In this instance, the ratio for processing the image as a black image (or black-image processing ratio) may be increased by reducing the reference ratio. In another example, in case the curvature of the curved surface of the display panel is small, in the view point of the viewer, the light leakage may not be distinctive in the partial area where light leakage occurs.

In this instance, the ratio for processing the image as a black image may be reduced by increasing the reference ratio. However, in case the curvature of the curved surface of the display panel is large, in the view point of the viewer, the light leakage may become more distinctive in the partial area where light leakage occurs. In this instance, the ratio for processing the image as a black image may be increased by reducing the reference ratio.

In yet another example, if content being displayed on a partial area where light leakage occurs undergoes a small amount of change in gray level, in the view point of the viewer, the light leakage may not be distinctive in the partial area where light leakage occurs. In this instance, the ratio for processing the image as a black image may be reduced by increasing the reference ratio.

However, if content being displayed on a partial area where light leakage occurs undergoes a large amount of change in gray level, in the view point of the viewer, the light leakage may become more distinctive in the partial area where light leakage occurs.

In this instance, the ratio for processing the image as a black image may be increased by reducing the reference ratio. Additionally, when the pixel distribution ratio of pixels having a minimum gray level is equal to or greater than the reference ratio, the digital device may process the luminance of the corresponding partial area to be black, and, then, the digital device may control the luminance of the remaining area of the entire display screen to be lower (or less) than the average luminance value respective to the entire display screen.

If a difference in luminance between the partial area, which is processed to be black, and the remaining area is too distinctive (or large), this may cause inconvenience to the viewer and the viewer's eyes, such as blinding of the eyes. In addition, therefore, by reducing the difference in the luminance between the partial area and the remaining area, a more comfortable and stable picture quality may be provided to the viewer.

Thereafter, by periodically analyzing the histogram respective to the partial area at constant intervals, the digital device may control a voltage, which is applied to some of the light sources, among multiple light sources being positioned in the display module.

Herein, the digital device may control a voltage, which is applied to some of the light sources, among multiple light sources being positioned in the display module, by periodically analyzing the histogram respective to the partial area at an interval of approximately 10 to 100 milliseconds (msec).

Figure 11:
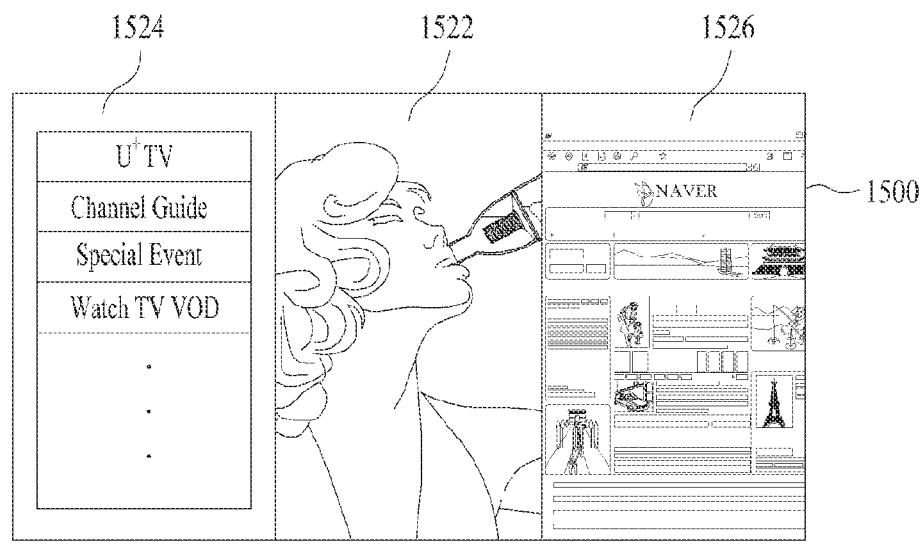
FIG. 11 and FIG. 12 illustrate display areas respective to a content type.
Figure 12:
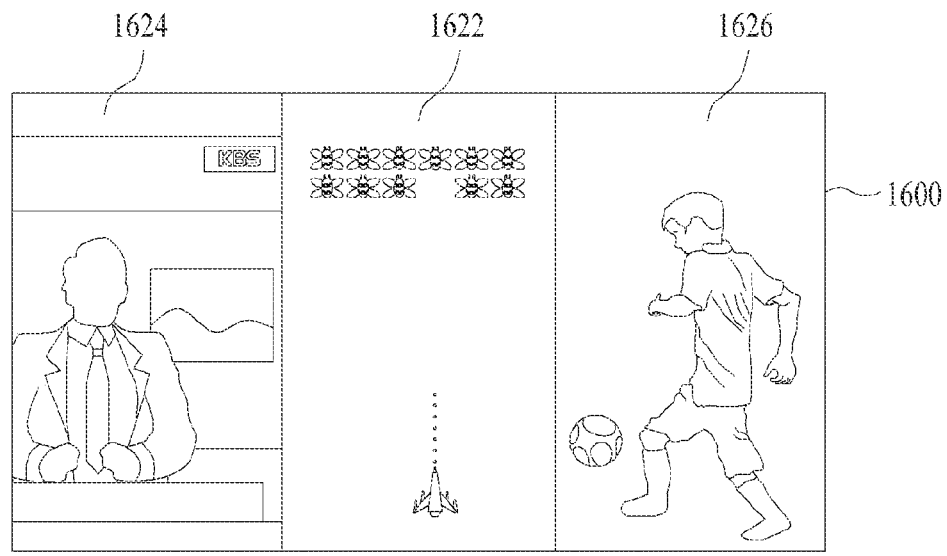

FIG. 11 and FIG. 12 illustrate display areas respective to a content type. As shown in FIG. 11 and FIG. 12, various types of content may be displayed on a display screen 1500 of the digital device. In addition, herein, display areas of each set of content may be decided in accordance with the content type based upon light-leakage, which occurs in partial areas of the display screen.

For example, in case light leakage occurs at an edge portion of the display screen 1500, in order to prevent the viewer from visually sensing the light leakage, the digital device may perform control operations so that content, which corresponds to a content type undergoing a small amount of change in the gray level, can be displayed on the edge portion of the display screen.

Herein, as shown in FIG. 11, the content type undergoing a small amount of change in the gray level may correspond to supplemental information, such as an EPG screen 1524, text information, such as a web page screen 1526, and so on, and, as shown in FIG. 12, the content type undergoing a small amount of change in the gray level may correspond to images, such as a news screen 1624 and a sports screen 1626, and so on.

Since change in luminance does not occur significantly between the image frames in such contents, even if light leakage occurs, the viewer can barely notice (or sense) any degradation in the picture quality. In addition, therefore, such contents may be displayed on the edge portion of the display screen where light leakage occurs.

Additionally, as shown in FIG. 11, the content type undergoing a large amount of change in the gray level may correspond to images, such as an advertisement screen 1522, and so on, and, as shown in FIG. 12, the content type undergoing a large amount of change in the gray level may correspond to images, such as a game screen 1622. Since change in luminance occurs significantly between the image frames in such contents, when light leakage occurs, the viewer can distinctively notice (or sense) degradation in the picture quality. In addition, therefore, such contents may be displayed on the center portion of the display screen where light leakage does not occur.

When the digital device displays the received content on the display screen, the digital device identifies a type of the received content, and, then, in accordance with the identified content type of the received content, the digital device decides an area where the identified content is to be displayed within the entire display screen. Thereafter, in accordance with the decided display area, the digital device may display the corresponding content on the display screen.

Herein, the type of the displayed content may be identified in accordance with a change in the gray level respective to the displayed content. Accordingly, when deciding the area where the content is to be displayed within the entire display screen in accordance with the identified content type, among the identified content types, the digital device may decide a content undergoing a small amount of change in the gray level as the content that is to be displayed on the edge portion of the entire display screen.

Additionally, the digital device may adjust (or control) the reference ratio, in accordance with the content being displayed on the area where light leakage occurs. For example, in case light leakage occurs at the edge portion of the display screen, the digital device may acquire information on the content being displayed on the area where light leakage occurs, and, then, the digital device may adjust the reference ratio in accordance with the acquired content information.

Thereafter, the digital device analyzes a histogram respective to the edge portion of the display screen. Afterwards, among the pixels being located at the edge portion of the display screen, by determining whether or not pixel distribution ratio of pixels having minimum gray level is equal to or greater than the adjusted reference ratio, the digital device may decide whether or not to process the displayed image as a black image.

Herein, the acquired content information may correspond to an amount of change in the gray level respective to the displayed content. For example, as shown in FIG. 11 and FIG. 12, in case content undergoing a small amount of change in the gray level, such as the EPG screen 1524, the web page screen 1526, the news screen 1624, and the sports screen 1626, and so on, is displayed on a partial area of the display screen where light leakage occurs, the digital device may decrease a ratio for processing a corresponding image as a black image (or black-image processing ratio) by increasing the reference ratio.

This is because, when content being displayed on a partial area of the display screen where light leakage occurs undergoes a small amount of change in the gray level, in the view point of the viewer, the light leakage may not be distinctive in the partial area where light leakage occurs. However, in case content undergoing a large amount of change in the gray level, such as the advertisement screen and the game screen, and so on, is displayed on a partial area of the display screen where light leakage occurs, the digital device may increase the ratio for processing the corresponding image as a black image by decreasing the reference ratio.

This is because, when content being displayed on a partial area of the display screen where light leakage occurs undergoes a large amount of change in the gray level, in the view point of the viewer, the light leakage may become more distinctive in the partial area where light leakage occurs.

Figure 13:
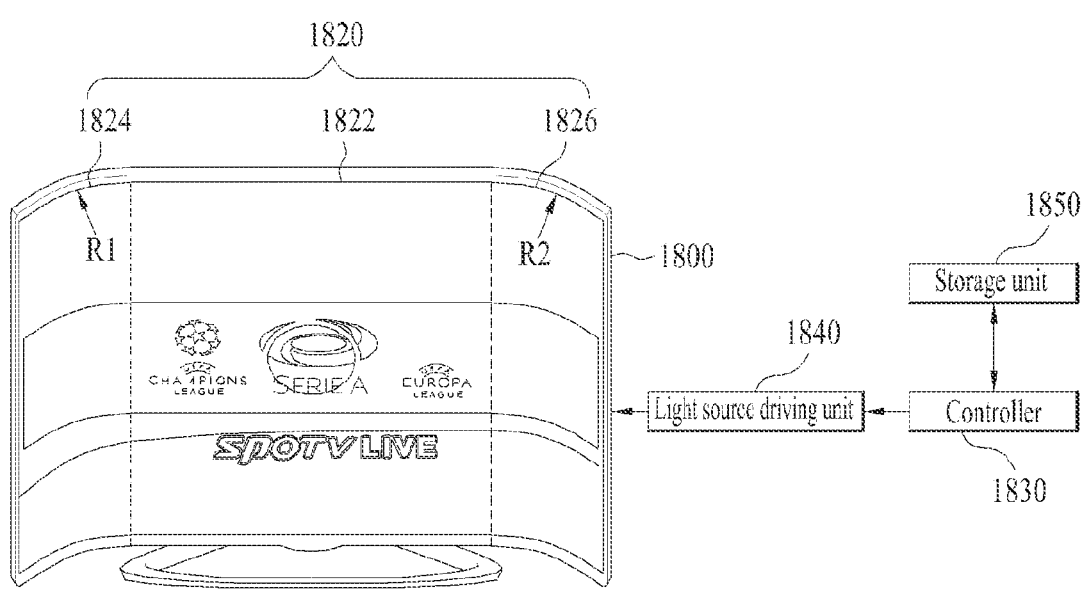
FIG. 13 to FIG. 15 illustrate a method for adjusting a standard ratio of the digital device according to an embodiment of the present invention.
Figure 14:
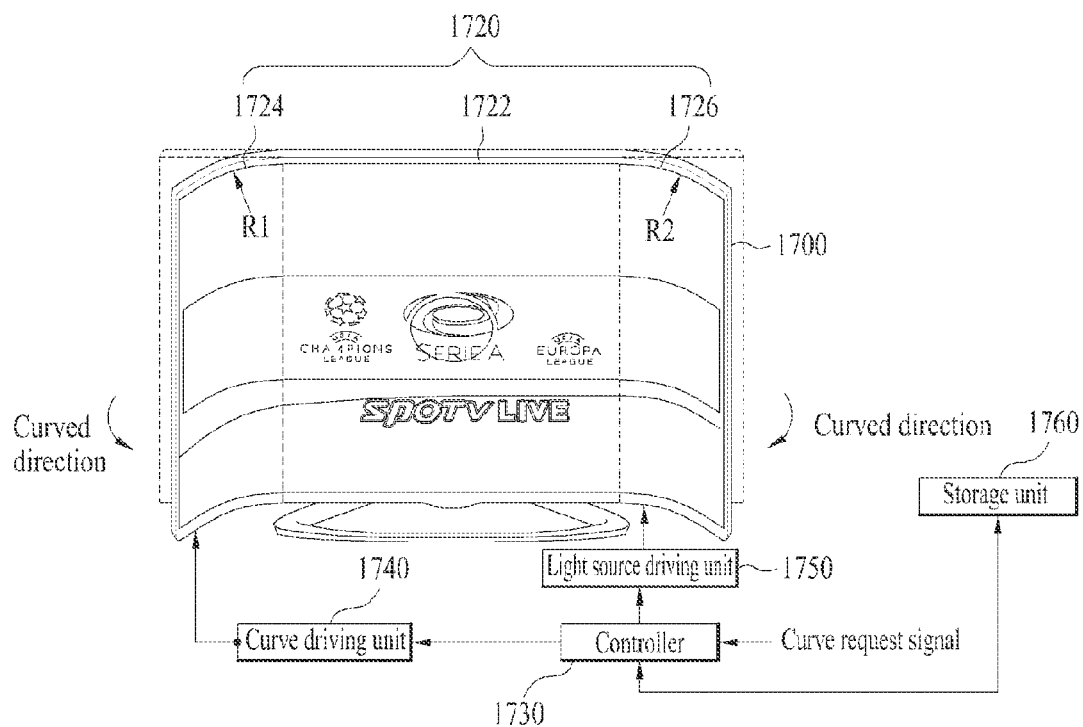
Figure 15:
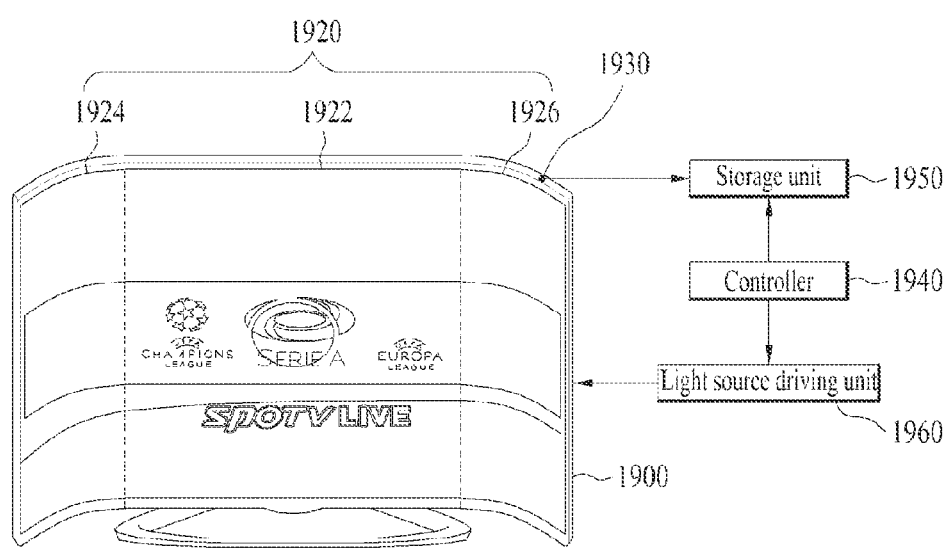
Figure 16:
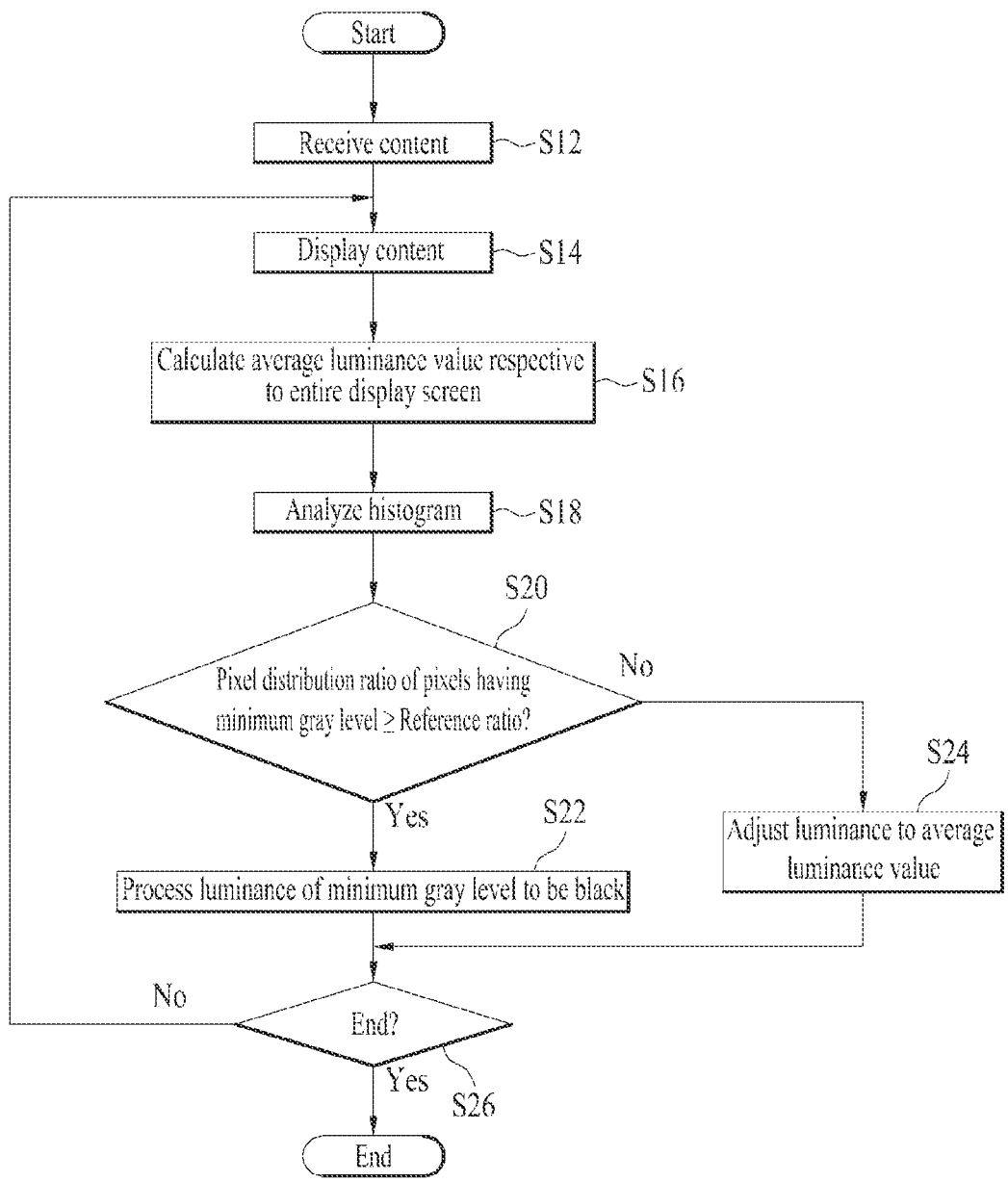
FIG. 16 to FIG. 21 illustrate flow charts of a method for controlling a digital device according to an embodiment of the present invention.
Figure 17:
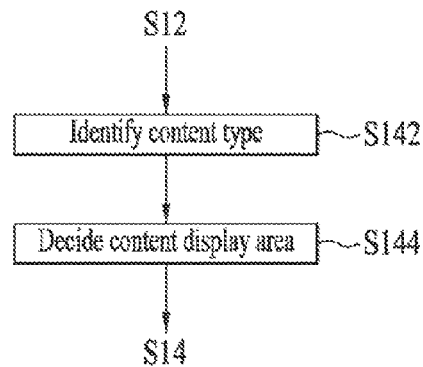
Figure 18:
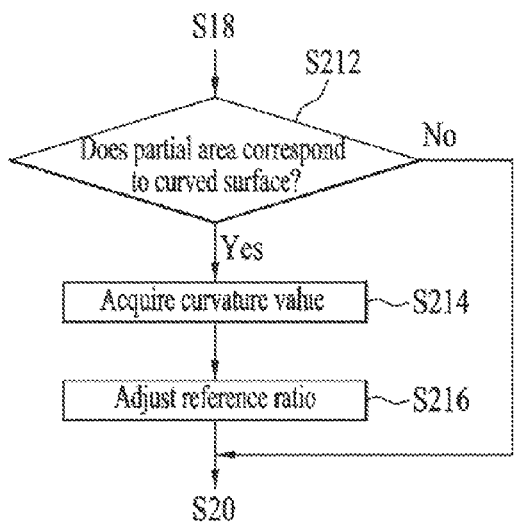
Figure 19:
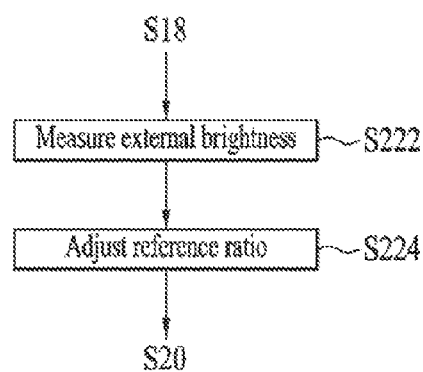
Figure 20:
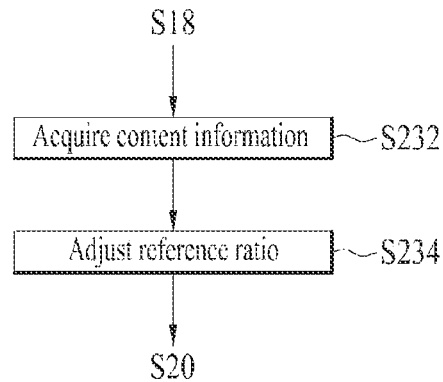

FIG. 13 to FIG. 15 illustrate a method for adjusting a standard ratio of the digital device according to an embodiment of the present invention. As shown in FIG. 13 to FIG. 15, the digital device analyzes a histogram respective to a partial area of the display screen, and, then, the digital device verifies whether or not, among pixels located in the corresponding partial area, a pixel distribution ratio of pixels having a minimum gray level is equal to or greater than a reference ratio.

Subsequently, if the pixel distribution ratio of pixels having a minimum gray level is equal to or greater than the reference ratio, the digital device processes the luminance of the partial area to be black. In addition, if the pixel distribution ratio of pixels having a minimum gray level is less than the reference ratio, the digital device may adjust the luminance of the corresponding partial area, so that the luminance corresponds to the average luminance value respective to the entire screen.

Herein, the reference ratio may be adjusted to diverse values. For example, the digital device may adjust (or control) the reference ratio in accordance with at least one of a curvature value of the curved surface respective to a partial area of a display panel, a surrounding external brightness of a partial area of the display panel, and content information being displayed on the partial area of the display panel.

As shown in FIG. 13, in case the curvature of the curved surface is fixed in the digital device 1800, a first edge portion 1824 of the display screen 1820 corresponds to a curved surface having a first curvature R1, a second edge portion 1826 of the display screen 1820 corresponds to a curved surface having a second curvature R2, and a center portion 1822 of the display screen 1820 corresponds to a flat surface.

In this instance, since the first curvature R1 and the second curvature R2 are predetermined, the reference ratio value for adjusting the luminance may also be predetermined and stored in a storage unit 1850. Therefore, when content is received, according to the histogram analysis, the controller 1830 may control the light source driving unit 1840 based upon the reference ratio value, which is stored in the storage unit 1850, and may then adjust the luminance of the display screen.

Alternatively, as shown in FIG. 14, in case the curvature of the curved surface is variable in the digital device 1700, a first edge portion 1724 of the display screen 1720 corresponds to a curved surface having a first curvature R1, a second edge portion 1726 of the display screen 1720 corresponds to a curved surface having a second curvature R2, and a center portion 1722 of the display screen 1720 corresponds to a flat surface.

In this instance, since the first curvature R1 and the second curvature R2 are variable, the reference ratio value for adjusting the luminance may also be varied and stored in a storage unit 1760. Therefore, when a curve request signal is received, the controller 1730 may control the light source driving unit 1750 in accordance with the received curve request signal, and may then adjust the curvature of the display screen.

In addition, the controller 1730 may decide a reference ratio value corresponding to the curvature of the display screen and may then store the decided value in the storage unit 1760. Thereafter, when content is received, according to the histogram analysis, the controller 1730 may control the light source driving unit 1750 based upon the reference ratio value, which is stored in the storage unit 1760, and may then adjust the luminance of the display screen.

As described above, in case the curvature of the curved surface of the display screen is small, in the view point of the viewer, the light leakage may not be distinctive in the partial area where light leakage occurs. In this instance, the controller 1730 may reduce the ratio for processing the image as a black image by increasing the reference ratio. Additionally, in case the curvature of the curved surface of the display panel is large, in the view point of the viewer, the light leakage may become more distinctive in the partial area where light leakage occurs.

In this instance, the controller 1730 may increase the ratio for processing the image as a black image by reducing the reference ratio. Alternatively, in case the digital device 1900 includes an illumination sensor 1930, which is configured to sense (or detect) illumination (or brightness) from an external source (or external brightness), as shown in FIG. 15, the controller 1940 may decide a reference ratio value for adjusting the luminance in accordance with the brightness of the external source, In addition, then, the controller 1940 may store the decided value in a storage unit 1950.

Therefore, the controller 1940 may decide a reference ratio value based upon the external brightness, which is sensed by the illumination sensor 1930, and may then store the decided reference ratio value in the storage unit 1950. Thereafter, when content is received, in accordance with the histogram analysis, the controller 1940 may control the light source driving unit 1960 based upon the reference ratio value, which is stored in the storage unit 1950, and may then adjust the luminance of the display screen.

As described above, if the luminance of a surrounding external environment is bright, in a view point (or stand point) of the viewer, the light leakage may not be distinctive in the partial area where light leakage occurs. In this instance, the controller 1940 may reduce the ratio for processing the image as a black image by increasing the reference ratio.

Additionally, if the luminance of a surrounding external environment is dark (or obscure), in the view point of the viewer, the light leakage may become more distinctive in the partial area where light leakage occurs. In this instance, the controller 1940 may increase the ratio for processing the image as a black image by reducing the reference ratio.

In yet another example, if content being displayed on a partial area where light leakage occurs undergoes a small amount of change in gray level, in the view point of the viewer, the light leakage may not be distinctive in the partial area where light leakage occurs. In this instance, the controller 1940 may reduce the ratio for processing the image as a black image by increasing the reference ratio.

However, if content being displayed on a partial area where light leakage occurs undergoes a large amount of change in gray level, in the view point of the viewer, the light leakage may become more distinctive in the partial area where light leakage occurs. In this instance, the controller 1940 may increase the ratio for processing the image as a black image by reducing the reference ratio.

FIG. 16 to FIG. 21 illustrate flow charts of a method for controlling a digital device according to an embodiment of the present invention. As shown in FIG. 16 to FIG. 21, a digital device may receive content (S12) and may then display the received content on a display screen (S14).

In some cases, when displaying the received content on the display screen, the digital device may identify a type of the received content (S142), and then, in accordance with the identified content type, the digital device decides an area where the received content is to be displayed within the entire display screen (S144). Thereafter, in accordance with the decided display area, the digital device may display the received content on the display screen.

In addition, the type of the displayed content may be identified in accordance with an amount of change in the gray level respective to the displayed content. Accordingly, among the identified content types, the digital device may decide a content undergoing a small amount of change in the gray level as the content that is to be displayed on the edge portion of the entire display screen.

Thereafter, the digital device may calculate an average luminance value respective to the entire display screen where the content is displayed (S16). In addition, then, the digital device may generate a histogram respective to a portion of the display screen and may then analyze the histogram (S18).

Herein, when generating the histogram, the digital device may generate a histogram including a distribution ratio of pixels respective to the gray level. Additionally, a partial area of the display screen where the histogram is generated may correspond to at least any one of a first edge portion, which is located on one side edge of a center portion of the entire display screen, and a second edge portion, which is located on another side edge of a center portion of the entire display screen.

Subsequently, among the pixels located in the corresponding partial area, the digital device verifies whether or not a pixel distribution ratio of pixels having minimum gray level is equal to or greater than a reference ratio (S20). In some cases, the digital device verifies whether or not a surface of the partial area corresponds to a curved surface (S212). Then, if the surface of the partial area corresponds to a curved surface, the digital device acquires a curvature value respective to the curved surface (S214). Thereafter, in accordance with the acquired curvature value, the digital device may adjust the reference ratio (S216).

In another case, the digital device may measure a surrounding external brightness of the partial area (S222) and may then adjust the reference ratio in accordance with the measured surrounding external brightness (S224). In yet another case, the digital device may acquire information on content being displayed on the partial area (S232). In addition, then, the digital device may adjust the reference ratio in accordance with the acquired content information (S234). Herein, the acquired content information may correspond to an amount of change in the gray level respective to the displayed content.

As described above, after adjusting the reference ratio, the digital device analyzes the histogram respective to the partial area of the display screen, so as to verify whether or not, among the pixels located in the partial area, a pixel distribution ratio of pixels having minimum gray level is equal to or greater than the adjusted reference ratio.

Thereafter, based upon the verified result, if the pixel distribution ratio of pixels having minimum gray level is equal to or greater than the reference ratio, the digital device may process the luminance of the partial area to be black (S22). However, based upon the verified result, if the pixel distribution ratio of pixels having minimum gray level is less than the adjusted reference ratio, the digital device may adjust the luminance of the partial area, so that the luminance can correspond to the average luminance value of the entire display screen (S24).

Afterwards, if the digital device receives an End luminance adjustment request signal, the digital device ends the operation process, In addition, if the digital device does not receive an End luminance adjustment request signal, the digital device may repeat step S16 and its subsequent process steps (S26). Herein, the digital device may periodically repeat the above-described operation process at an interval of approximately 10 to 100 milliseconds (msec).

Figure 21:
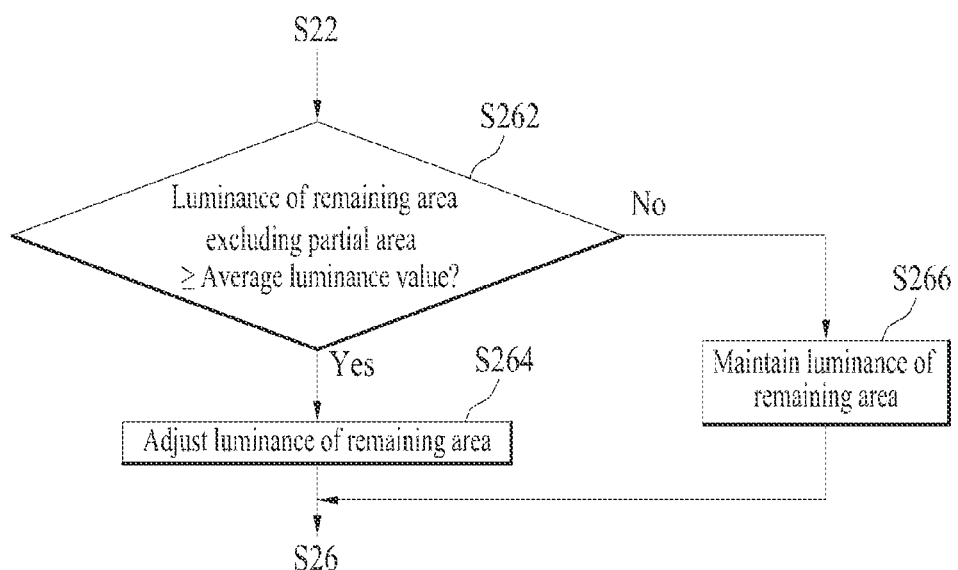

Additionally, while adjusting the luminance of the partial area, the digital device may adjust the luminance, so that the luminance of the remaining area can correspond to the average luminance value of the entire display screen. In some cases, as shown in FIG. 21, the digital device may first process the luminance of the partial area to be black and may then verify whether or not the luminance of the remaining area of the entire display screen, wherein the partial area is excluded, is equal to or greater than the average luminance value of the entire display screen (S262).

Thereafter, if the luminance of the remaining area of the entire display screen is equal to or greater than the average luminance value of the entire display screen, the digital device may adjust the luminance of the remaining area to be less than the average luminance value (S264). However, if the luminance of the remaining area of the entire display screen is less than the average luminance value of the entire display screen, the digital device may maintain the luminance of the remaining area of the entire display screen (S266).

More specifically, when processing the luminance of the partial area to be black, the digital device may adjust the luminance of the remaining area of the entire display screen, wherein the partial area is excluded, so that the luminance of the remaining area is lower than the average luminance value respective to the entire display screen.

If a difference in luminance between the partial area, which is processed to be black, and the remaining area is too distinctive (or large), this may cause inconvenience to the viewer and the viewer's eyes, such as blinding of the eyes. In addition, therefore, by reducing the difference in the luminance between the partial area and the remaining area, a more comfortable and stable picture quality may be provided to the viewer.

As described above, the digital device and the method for controlling the same according to an embodiment of the present invention have the following advantages. By analyzing a histogram respective to a partial area of the display screen where the light-leakage property (or light leakage) occurs and by adjusting the luminance accordingly, the present invention can eliminate (or remove) light leakage and may stabilize the picture quality of the display screen.

Furthermore, by categorizing content undergoing a small amount of change in the gray level and by displaying the categorized content in a partial area where light leakage occurs, the present invention can stabilize the picture quality of the display screen.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A method for controlling a digital device, the method comprising:
receiving content;
displaying the received content on a display screen of the digital device;
calculating, via a controller of the digital device, an average luminance value respective to an entire display screen where the received content is displayed;
generating, via the controller, a histogram respective to a partial area of the entire display screen;
analyzing, via the controller, the histogram respective to the partial area and verifying whether or not a pixel distribution ratio of pixels having a minimum gray level, among pixels being located in the partial area of the display screen, is equal to or greater than a reference ratio; and
if the pixel distribution ratio of pixels having the minimum gray level is equal to or greater than the reference ratio, processing a luminance of the partial area of the display screen to be black,
wherein the display screen includes a center portion having a flat surface and a first and second edge portions having a curved surface which is located on side edges of the center portion, and
wherein the method further comprises controlling, via the controller, the luminance of the first and second edge portions based on the histogram including the pixel distribution ratio of pixels having the minimum gray level in the first and second edge portions having the curved surface.

2. The method of claim 1, wherein the displaying the received content on the display screen comprises:
identifying a type of the received content;
deciding a display area within the entire display screen where the received content is to be displayed, in accordance with the identified type of the content; and
displaying the content on the display screen in accordance with the decided display area.

3. The method of claim 1, wherein the verifying whether or not the pixel distribution ratio of pixels having the minimum gray level is equal to or greater than the reference ratio comprises:
verifying whether or not a surface of the partial area corresponds to a curved surface of the display screen;
if the partial area corresponds to the curved surface, acquiring a curvature value respective to the curved surface;
adjusting the reference ratio in accordance with the acquired curvature value; and
analyzing the histogram respective to the partial area and verifying whether or not the pixel distribution ratio of pixels having the minimum gray level is equal to or greater than the adjusted reference ratio.

4. The method of claim 1, wherein the verifying whether or not the pixel distribution ratio of pixels having the minimum gray level is equal to or greater than the reference ratio comprises:
measuring a surrounding external brightness of the partial area;
adjusting the reference ratio in accordance with the measured external brightness; and
analyzing the histogram respective to the partial area and verifying whether or not the pixel distribution ratio of pixels having the minimum gray level is equal to or greater than the adjusted reference ratio.

5. The method of claim 1, wherein the verifying whether or not the pixel distribution ratio of pixels having the minimum gray level is equal to or greater than the reference ratio comprises:
acquiring information on content being displayed on the partial area;
adjusting the reference ratio in accordance with the acquired content information; and
analyzing the histogram respective to the partial area and verifying whether or not the pixel distribution ratio of pixels having the minimum gray level is equal to or greater than the adjusted reference ratio.

6. The method of claim 1, further comprising:
in the analyzing the histogram respective to the partial area and verifying whether or not the pixel distribution ratio of pixels having the minimum gray level is equal to or greater than the reference ratio, if the pixel distribution ratio of pixels having the minimum gray level is less than the reference ratio, adjusting a luminance of the partial area so as to correspond to the average luminance value respective to the entire display screen.

7. The method of claim 1, further comprising:
after performing the processing the luminance of the partial area of the display screen to be black, if the pixel distribution ratio of pixels having the minimum gray level is equal to or greater than the reference ratio, adjusting a luminance of a remaining area of the entire display screen, wherein the partial area is excluded, to be less than the average luminance value of the entire display screen.

8. The digital device of claim 1, wherein the controller is further configured to control the display screen, so as to allow at least any one of the first edge portion and the second edge portion of the display module to have a curved surface in accordance with the request signal received from the external source.

9. The digital device of claim 8, wherein the controller is further configured to control the display screen, so as to allow the curvature of the curved surface to vary gradually in accordance with the request signal received from the external source.

10. A digital device, comprising:
a communication module configured to receive content;
a display module configured to display the received content on a display screen; and
a controller configured to:
calculate an average luminance value respective to the entire display screen where the received content is displayed,
generate a histogram respective to a partial area of the entire display screen,
analyze the histogram respective to the partial area and verify whether or not a pixel distribution ratio of pixels having a minimum gray level, among pixels being located in the partial area of the display screen, is equal to or greater than a reference ratio, and
control a voltage being supplied to a part of multiple light sources positioned in the display module, so as to process a luminance of the partial area of the display screen to be black, if the pixel distribution ratio of pixels having the minimum gray level is equal to or greater than the reference ratio,
wherein the display screen includes a center portion having a flat surface and a first and second edge portions having a curved surface which is located on side edges of the center portion, and the controller controls the luminance of the first and second edge portions based on the histogram including the pixel distribution ratio of pixels having the minimum gray level in the first and second edge portions having the curved surface.

11. The digital device of claim 10, wherein the controller is further configured to decide a display area within the entire display screen where the received content is to be displayed, in accordance with a type of the received content.

12. The digital device of claim 11, wherein the type of the content corresponds to an amount of change in gray level respective to the content.

13. The digital device of claim 10, wherein the controller is further configured to adjust the reference ratio in accordance with at least any one of a curvature value of the curved surface respective to the partial area of the display screen, a surrounding external brightness of the partial area of the display screen, and content information being displayed on the partial area of the display screen.

14. The digital device of claim 10, wherein, if the pixel distribution ratio of pixels having the minimum gray level is less than the reference ratio, the controller is further configured to adjust the luminance of the partial area, so as to allow the luminance of the partial area to correspond to the average luminance value respective to the entire display screen of the display module.

15. The digital device of claim 10, wherein, if the pixel distribution ratio of pixels having the minimum gray level is equal to or greater than the reference ratio, the controller is further configured to process the luminance of the partial area to be black, and wherein the controller is further configured to adjust a luminance of a remaining area of the display screen, where the partial area is excluded, so as to allow the luminance of the remaining area to be less than the average luminance value respective to the entire display screen of the display module.

16. The digital device of claim 10, wherein the controller is further configured to periodically analyze the histogram respective to the partial area at constant intervals, so as to control the voltage being supplied to the part of multiple light sources positioned in the display module.

* * * * *